United States Patent
Schuster

(10) Patent No.: US 11,415,161 B2
(45) Date of Patent: Aug. 16, 2022

(54) FASTENING SYSTEM AND METHOD

(71) Applicant: Sonix Enterprises Inc., London (CA)

(72) Inventor: Fridolin Schuster, London (CA)

(73) Assignee: SONIX ENTERPRISES INC., London (CA)

( * ) Notice: Subject to any disclaimer, the term of this patent is extended or adjusted under 35 U.S.C. 154(b) by 1 day.

(21) Appl. No.: 17/027,879

(22) Filed: Sep. 22, 2020

(65) Prior Publication Data
US 2021/0088067 A1 Mar. 25, 2021

Related U.S. Application Data

(60) Provisional application No. 62/904,963, filed on Sep. 24, 2019.

(51) Int. Cl.
F16B 23/00 (2006.01)
F16B 5/02 (2006.01)

(52) U.S. Cl.
CPC ............ F16B 23/0007 (2013.01); F16B 5/02 (2013.01)

(58) Field of Classification Search
CPC ..... B25B 23/02; B25B 23/12; B25B 23/0021; B25B 23/0035; B25B 23/00; B25B 23/0042; B25B 23/08; B25B 23/108; F16B 23/0007; F16B 23/00; F16B 23/0023; F16B 23/0069; F16B 23/0092
See application file for complete search history.

(56) References Cited

U.S. PATENT DOCUMENTS

| 968,783 | A | | 8/1910 | Moore |
| 1,396,455 | A | | 11/1921 | Moore |
| 4,663,998 | A | * | 5/1987 | Parsons ................... B25B 23/12 |
| | | | | 81/125 |
| 7,162,938 | B1 | | 1/2007 | Peters |
| 7,713,013 | B2 | | 5/2010 | Sedgwick et al. |
| 8,667,872 | B2 | | 3/2014 | McCullough et al. |
| 2005/0155211 | A1 | | 7/2005 | Powell |
| 2018/0015596 | A1 | * | 1/2018 | Kim ........................ F16B 37/14 |

FOREIGN PATENT DOCUMENTS

| CN | 205478786 U | 8/2016 |
| CN | 205503694 U | 8/2016 |
| CN | 209414359 U | 9/2019 |
| DE | 3701574 A1 | 8/1988 |

(Continued)

Primary Examiner — Jason L Vaughan
Assistant Examiner — Amanda Kreiling
(74) Attorney, Agent, or Firm — Gowling WLG (Canada) LLP

(57) ABSTRACT

A fastening system including a bolt with a shank defining a bolt axis and a bolt head secured to the shank. The bolt head includes a bolt head body with two channels therein, and two slots aligned with the channels. The channels and the slots extend between oppositely positioned axis-parallel surfaces. The channels are partially defined by internal walls in the bolt head body. The bolt head includes a cap surface transverse to the bolt axis. The system also includes a tool with a blade defining a tool axis, with a tip located at the second end. The tip is receivable in the channels. To rotate the bolt, the tip is positioned in a selected one of the channels, to align the tool axis with the bolt axis. Rotation of the bolt is urged by the tool, when the tool is rotated about the tool axis.

17 Claims, 10 Drawing Sheets

(56) References Cited

FOREIGN PATENT DOCUMENTS

| | | |
|---|---:|---|
| FR | 2390616 A1 | 12/1978 |
| FR | 2689801 A1 | 10/1993 |
| JP | H112222 A | 1/1999 |
| JP | 2011001967 A | 1/2011 |
| JP | 2017207077 A | 11/2017 |
| WO | 97/28928 A1 | 8/1997 |
| WO | 2015/167503 A1 | 11/2015 |

\* cited by examiner

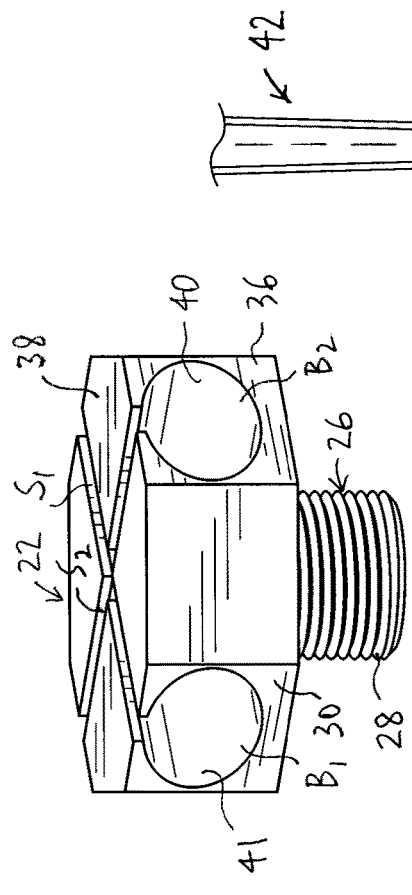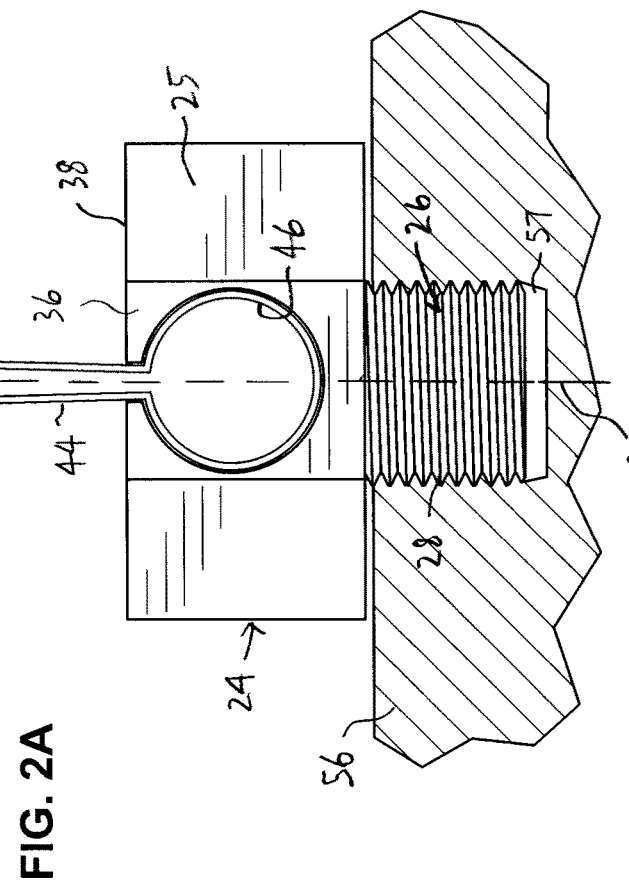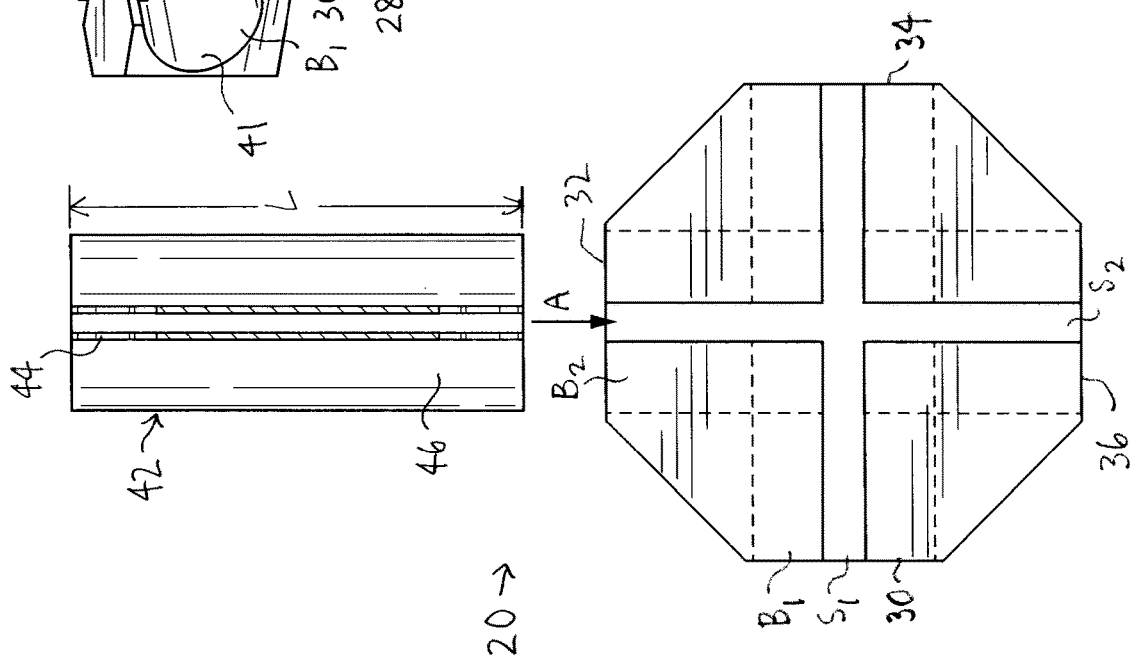

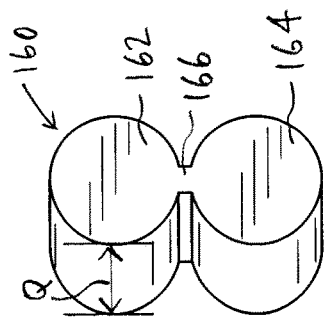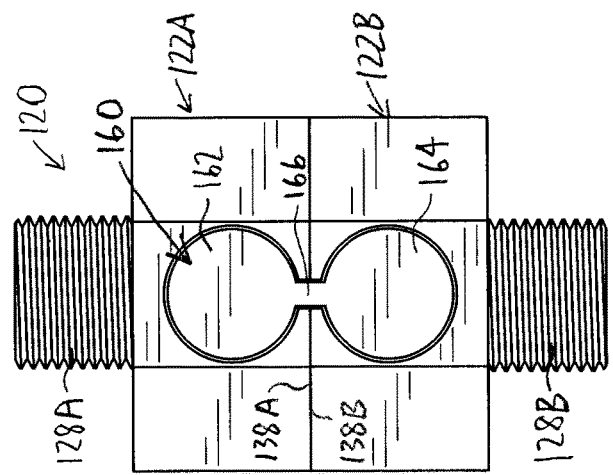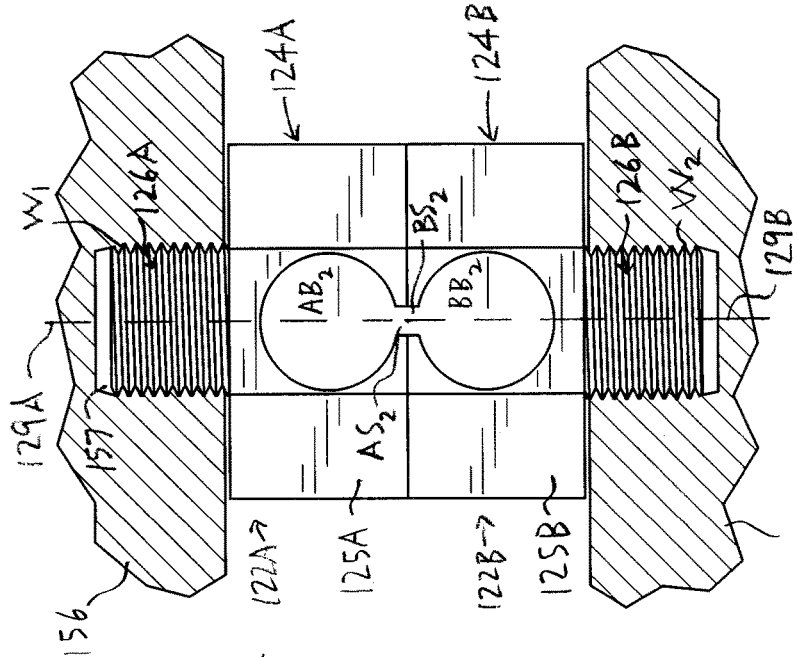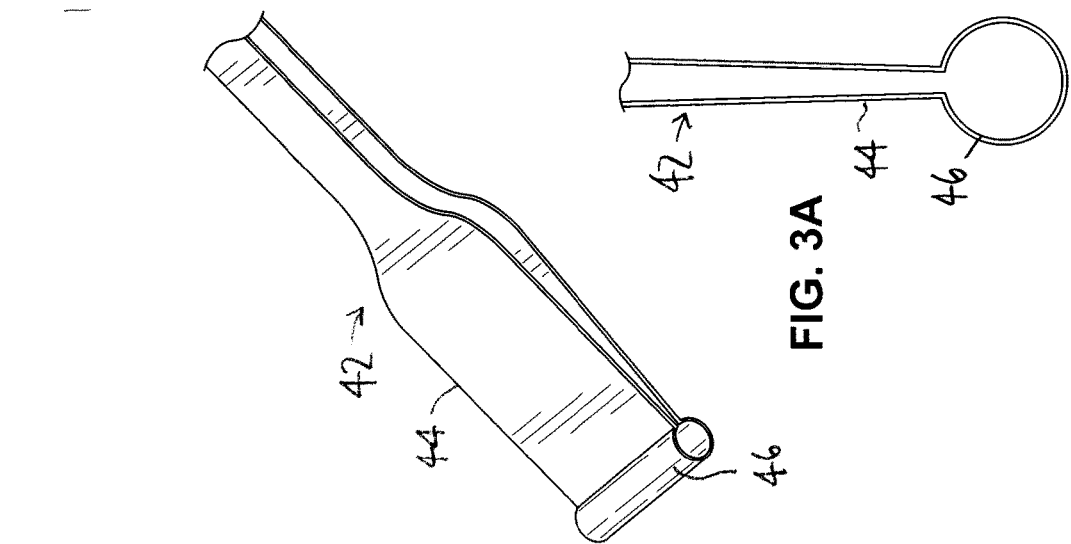

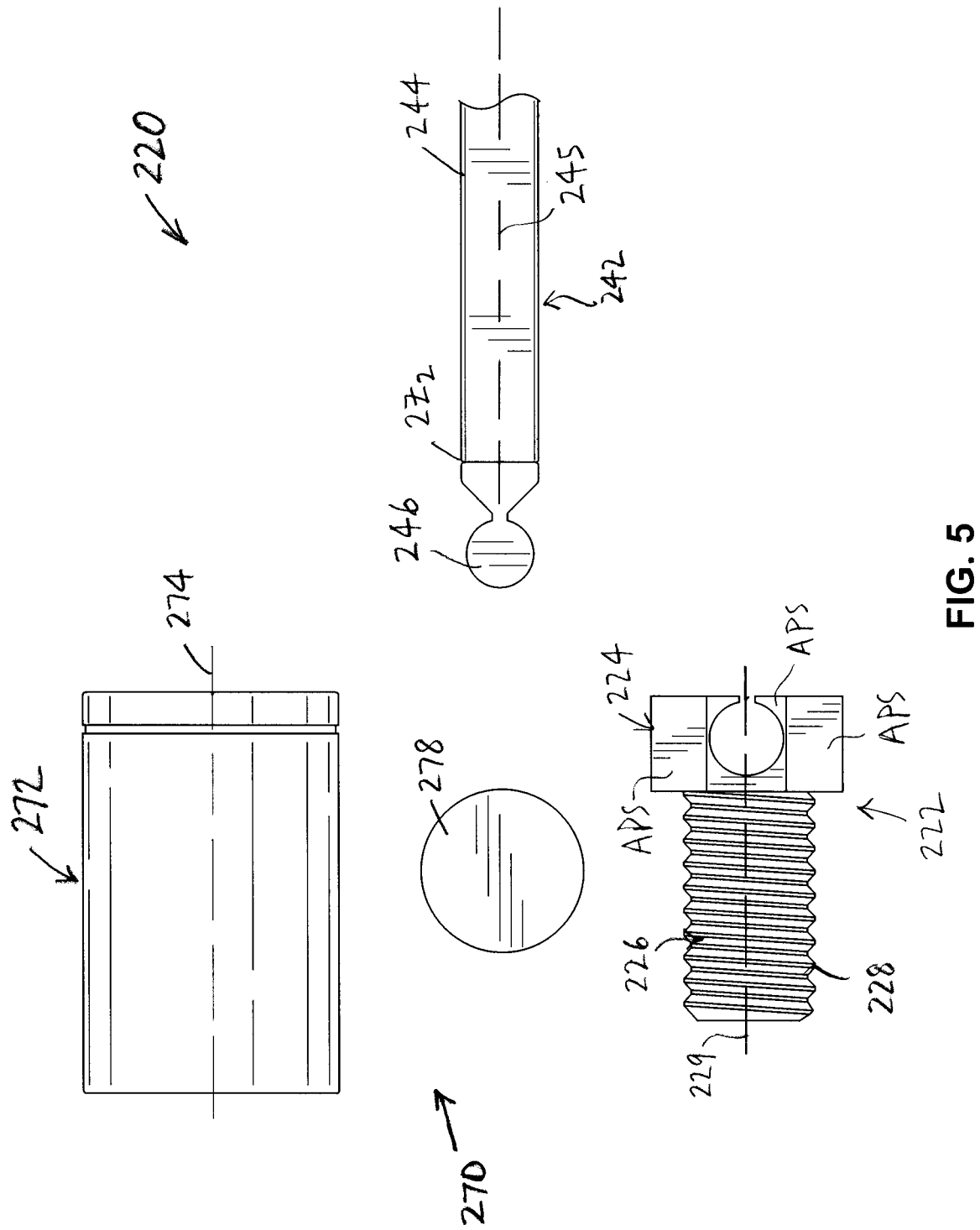

FASTENING SYSTEM AND METHOD

CROSS-REFERENCE TO RELATED APPLICATION

This application claims the benefit of U.S. Provisional Patent Application No. 62/904,963, filed on Sep. 24, 2019, the entirety of which is hereby incorporated by reference.

FIELD OF THE INVENTION

The present invention is a fastening system including a bolt and a tool for rotating the bolt, and a method of utilizing the bolt and the tool for fastening objects together.

BACKGROUND OF THE INVENTION

As is well known in the art, bolts include bolt heads which are formed to receive, or to be engaged by, various tools, e.g., screwdrivers, and/or wrenches or sockets. However, in certain circumstances, it may be difficult to engage the tool with the bolt head, or it may be difficult to keep the tool engaged with the bolt head.

SUMMARY OF THE INVENTION

For the foregoing reasons, there is a need for a fastening system that overcomes or mitigates one or more of the defects or disadvantages of the prior art.

In its broad aspect, the invention includes a fastening system including a bolt with a shank defining a bolt axis and a bolt head secured to the shank having a threaded portion. The bolt head includes a bolt head body with two channels therein, and two slots aligned with the channels. The channels and the slots extend between oppositely positioned axis-parallel surfaces. The channels are partially defined by internal walls in the bolt head body. The bolt head includes a cap surface transverse to the bolt axis. The system also includes a tool with a blade defining a tool axis, with a tip located at the second end. The tip is receivable in the channels. To rotate the bolt, the tip is positioned in a selected one of the channels, to align the tool axis with the bolt axis. Rotation of the bolt is urged by the tool, when the tool is rotated about the tool axis, engaging the tip with the internal wall of the channel in which the tip is located.

BRIEF DESCRIPTION OF THE DRAWINGS

The invention will be better understood with reference to the attached drawings, in which:

FIG. 2A is an isometric view of the bolt of FIG. 1A;

FIG. 2B is a top view of the bolt of FIG. 1A and an embodiment of a tool of the invention;

FIG. 2C is a side view of the bolt of FIG. 1A with a tip and a blade of the tool of FIG. 2B received in a channel and an associated slot of the bolt;

FIG. 3A is an isometric view of an embodiment of a tool of the invention;

FIG. 3B is a side view of the tool of FIG. 3A;

FIG. 4A is a side view of an alternative embodiment of the fastening system of the invention;

FIG. 4B is an isometric view of an embodiment of a locking device of the invention;

FIG. 4C is a side view of the system of FIG. 4A, with the locking device of FIG. 4B positioned therein;

FIG. 5 is a plan view of elements of an alternative embodiment of the fastening system of the invention;

DETAILED DESCRIPTION

Figure 1B:
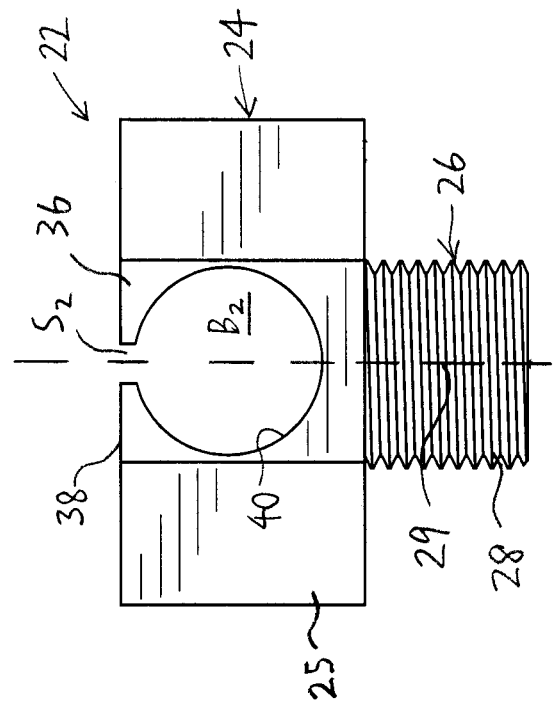
FIG. 1B is a side view of the bolt of FIG. 1A.
Figure 1A:
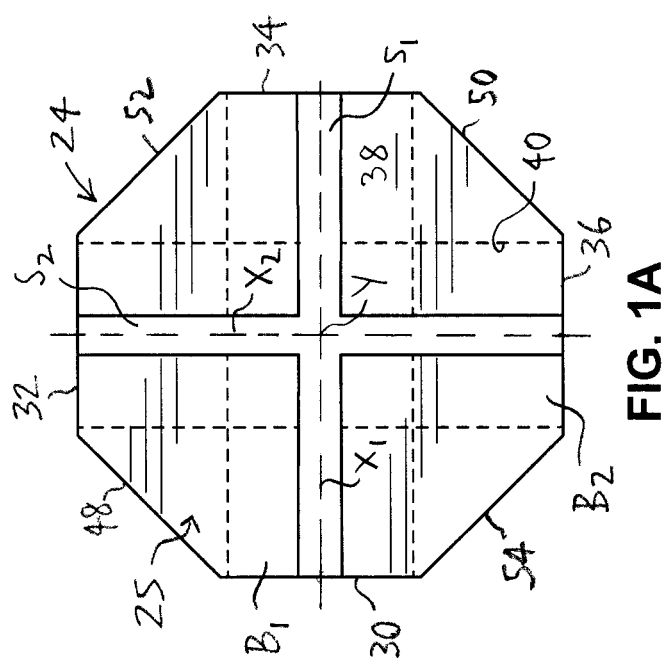
FIG. 1A is an end view of an embodiment of a bolt head of the bolt of the invention.

In the attached drawings, like reference numerals designate corresponding elements throughout. Reference is first made to FIGS. 1A-3B to describe an embodiment of a fastening system in accordance with the invention indicated generally by the numeral 20 (FIGS. 2B, 2C). As can be seen in FIGS. 1A and 1B, in one embodiment, the fastening system 20 preferably includes a bolt 22 with a bolt head 24 and a shank 26. As is known in the art, the shank 26 preferably includes a threaded portion 28 (FIG. 1B). It will be understood that the bolt head 24 and the shank 26 are secured together, or integrally formed. The shank 26 defines a bolt axis 29. The bolt 22 is symmetrical relative to the bolt axis 29 (FIG. 1B).

As can be seen in FIG. 1A, in one embodiment, the bolt head 24 preferably includes a bolt head body 25 having at least four surfaces 30, 32, 34, 36, pairs of which are positioned opposite to each other. For instance, in FIG. 1A, the surfaces 30 and 34 are a pair of surfaces, referred to hereinafter as first surfaces, that are positioned opposite to each other, and also the surfaces 32, 36 are another pair of surfaces, referred to hereinafter as second surfaces, that are positioned opposite to each other.

The bolt head body 25 preferably also includes a cap surface 38 that is generally transverse to the first surfaces 30, 34, and to the second surfaces 32, 36.

Preferably, the bolt head 24 also includes first and second channels "$B_1$", "$B_2$" in the bolt head body 25, each of the first and second channels "$B_1$", "$B_2$" extending between the surfaces that are in a pair positioned opposite to each other. For example, as can be seen in FIG. 1A, the first channel "$B_1$" extends between the first surfaces 30, 34, and the second channel "$B_2$" extends between the second surfaces 32, 36.

The first and second channels "$B_1$", "$B_2$" preferably are at least partially defined by internal walls 40 in the bolt head body 25. The first channel "$B_1$" preferably is at least partially defined by the internal wall 40A that extends between the first surfaces 30, 34. The second channel "$B_2$" is at least partially defined by the internal wall 40B that extends between the second surfaces 32, 36. It will be understood that the internal wall 40A is orthogonal to the first surfaces 30, 34, and that the internal wall 40B is orthogonal to the second surfaces 32, 36 (FIGS. 1A, 2A).

In one embodiment, the respective internal walls 40A, 40B of the first and second channels "$B_1$", "$B_2$" preferably define each of the first and second channels "$B_1$", "$B_2$" as being substantially circular in cross-section (FIGS. 1A, 1B). Also, the first channel "$B_1$" preferably is partially defined by an axis "$X_1$" thereof, and the second channel "$B_2$" is partially defined by an axis "$X_2$" thereof (FIG. 1A).

It is also preferred that the bolt head 24 includes first and second slots "$S_1$", "$S_2$", which are respectively aligned with the axes "$X_1$", "$X_2$" of the first and second channels "$B_1$", "$B_2$" (FIGS. 1A, 1B). Preferably, and as can be seen in FIGS. 1A and 1B, the slots "$S_1$", "$S_2$" are also in fluid communication with the first and second channels "$B_1$", "$B_2$" respectively. The first and second slots "$S_1$", "$S_2$" preferably extend respectively between the first and second channels "$B_1$", "$B_2$" and the cap surface 38.

As can be seen in FIGS. 2B, 2C, 3A, and 3B, the system 20 preferably also includes a tool 42 that includes a blade 44 extending between first and second ends "$Z_1$", "$Z_2$" thereof. It is also preferred that the blade 44 defines a tool axis 45 of the tool 42. Preferably, the tool 42 also includes a tip 46 that is located at the second end "$Z_2$" of the blade 44.

As will be described, the tip 46 preferably is receivable in a selected one of the first and second channels "$B_1$", "$B_2$" (FIG. 2C). As will also be described, the blade 44 preferably is receivable in a corresponding one of the first and second slots "$S_1$", "$S_2$" that corresponds to the selected one of the first and second channels "$B_1$", "$B_2$".

When the tip 46 of the tool 42 is received in the selected one of the first and second channels "$B_1$", "$B_2$", and the blade 44 is received in the corresponding one of the first and second slots "$S_1$", "$S_2$", the tip 46 of the tool 42 is engageable with the internal wall that partially defines the selected one of the first and second channels "$B_1$", "$B_2$". Rotation of the blade 44 about the tool axis 45 causes the tip 46 to engage the internal wall and thereby to urge corresponding rotation of the bolt head 24 about the bolt axis 29.

As can be seen in FIG. 2B, the first channel "$B_1$" extends between the first surfaces 30, 34, and the second channel "$B_2$" extends between the second surfaces 32, 36. The first slot "$S_1$" extends between the first surfaces 30, 34 (FIG. 2B). The second slot "$S_2$" extends between the second surfaces 32, 36.

In use, a user (not shown) selects either the first channel "$B_1$" or the second channel "$B_2$", and locates the tip 46 in the selected one of the first and second channels "$B_1$", "$B_2$". The tip 46 is initially inserted at an end of the selected channel, e.g., if the first channel "B" is selected, then the tip 46 is initially inserted at the end "$C_1$" of the first channel "B" located proximal to the first surface 30, or at the end "$C_2$" of the first channel "$B_1$" that is located proximal to the first surface 34.

Those skilled in the art would appreciate that, when the tip 46 is initially inserted into the selected one of the first and second channels "$B_1$", "$B_2$", the blade 44 is simultaneously initially inserted into the corresponding one of the first and second slots "$S_1$", "$S_2$". As an example, if the tip 46 is inserted at the end "$C_1$" of the first channel "$B_1$", then at the same time the blade 44 is inserted at the end "$E_1$" of the first slot "$S_1$".

As can be seen in FIGS. 1A and 2B, the first and second channels "$B_1$", "$B_2$" preferably are located orthogonal to each other. Because the first and second slots "$S_1$", "$S_2$" are aligned with the first and second channels "$B_1$", "$B_2$", in this embodiment, the first and second slots "$S_1$", "$S_2$" intersect in the bolt head 24 at a point that is aligned with the bolt axis 29 (FIG. 1A). For clarity of illustration, the point at which the first and second slots intersect is identified as "Y" in FIG. 1A.

Those skilled in the art would also appreciate that, in use, the tip 46 that is inserted in the selected one of the first and second channels "$B_1$", "$B_2$" and the blade 44 that is inserted in the corresponding one of the first and second slots "$S_1$", "$S_2$" preferably are moved along the selected one of the first and second channels, and along the corresponding one of the first and second slots, until the tool axis 45 is aligned with the bolt axis 29. Once the tool axis 45 is aligned (or substantially aligned) with the bolt axis 29, the blade 44 preferably is rotated, to engage the tip 46 with the internal wall of the selected one of the first and second channels "$B_1$", "$B_2$", for urging rotation of the bolt 22 about the bolt axis 29. The bolt 22 may be urged, by rotation of the tool 42, in a direction of rotation to cause it to be tightened in a threaded hole 57 in an object 56 (FIG. 2C), or in a rotation in an opposite direction to cause it to be loosened in the threaded hole 57, as would be appreciated by those skilled in the art.

It will be understood that the first and second channels "$B_1$", "$B_2$" may have any suitable cross-sectional shape. For example, as illustrated in FIGS. 1B, 2A, and 2C, the first and second channels "$B_1$", "$B_2$" may be generally round in cross-section. Those skilled in the art would appreciate that the tip 46 preferably is shaped and sized to fit into the first and second channels "$B_1$", "$B_2$". It is preferred that the tip 46 fits into the first and second channels "$B_1$", "$B_2$" in a clearance fit.

Accordingly, as can be seen in FIG. 3B, in one embodiment the tip 46 preferably has a generally cylindrical shape, i.e., the tip 46 is substantially round in cross-section, to fit into the first and second channels "$B_1$", "$B_2$" as illustrated in FIGS. 1B, 2A, and 2C. It is preferred that the tip 46 is formed to fit easily into each of the first and second channels "$B_1$", "$B_2$". However, in order for the tool 42 to be usable to urge the bolt 22 to turn about its axis 29, it is also preferred that the tolerance between the tip 46 and the internal walls 40 of the first and second channels "$B_1$", "$B_2$" is relatively small, e.g., approximately 2 thousandths of an inch (0.002 inch).

The tool 42 may be made of any suitable material(s), and may have any suitable configuration. For instance, in one embodiment, the blade 44 and/or the tip 46 may be hollow, or alternatively, the blade 44 and/or the tip 46 may be solid. The tip 46 may have any suitable length. However, it is preferred that the tip 46 has a length "L" that is approximately the same as the lengths of each of the first channels "$B_1$", "$B_2$" (FIG. 2B).

As noted above, the first and second channels "$B_1$", "$B_2$" may have any suitable shape, in cross-section. Accordingly, the tip 46 may also have any suitable shape, as long as the shape and size of the tip 46 enables the tip 46 to fit into the first and second channels "$B_1$", "$B_2$" in a clearance fit (as described above). It will be understood that, in one embodiment, the first and second channels "$B_1$", "$B_2$" preferably are substantially the same size, so that the same tool 42 may be used with each.

As noted above, it is preferred that the first and second slots "$S_1$", "$S_2$" are respectively aligned with the axes "$X_1$", "$X_2$" of the channels "$B_1$", "$B_2$". The first slot "$S_1$" is in fluid communication with the first channel "$B_1$", and the second slot "$S_2$" is in fluid communication with the second channel "$B_2$". Those skilled in the art would appreciated that this enables the blade 44 to slide along the corresponding slot while the tip 46 is moved along the selected one of the first and second channels "$B_1$", "$B_2$" that is in fluid communication with the corresponding slot. For illustrative purposes, the tool 42 is shown in FIG. 2B in position immediately prior to its entry into the second slot "$S_2$" and the second channel "$B_2$".

In order to position the tip 46 in the selected one of the first and second channels "B₁", "B₂", the user (not shown) slides the tip 46 into the selected one of the first and second channels "B₁", "B₂". For example, as illustrated in FIG. 2B, the tool 42 preferably is moved in the direction indicated by arrow "A" to locate the tip 46 in the second channel "B₂", and simultaneously to locate the blade 44 in the corresponding slot "S₂". As noted above, once the tip 46 is located in the selected one of the first and second channels, the user may use the tool 42 to urge the bolt 22 to rotate about the bolt axis 29, i.e., either to tighten the bolt 22 or to loosen the bolt 22 in a threaded hole in a component (not shown) in which the threaded portion 28 is at least partially threadably engaged.

It will be understood that, to remove the tip 46 from the channel "B₂", the tip 46 may be moved in the direction opposite to that indicated by arrow "A" until the tip 46 clears (i.e., is past) the surface 32. Alternatively, the tip 46 may be moved further in the direction indicated by arrow "A", until the tip 46 clears the surface 36.

It is preferred that the tip 46 is magnetized, and that the bolt head 34 is made of a magnetic material. Those skilled in the art would be aware of suitable materials.

The bolt head 24 may have any suitable configuration. It will be understood that the bolt head 24 as illustrated in FIGS. 1A-2C is only an example of the bolt head of the invention. Preferably, the first and second surfaces 30, 34 and 32, 36 are positioned parallel to the bolt axis 29. Accordingly, the surfaces 30, 34 and 32, 36 are sometimes hereinafter generally referred to as "axis-parallel surfaces".

As illustrated, the bolt head 24 preferably includes additional surfaces 48, 50, 52, 54 that are located between the respective side surfaces 30-36 (FIG. 1A). For the purposes hereof, the surfaces 48, 50 are referred to as the third surfaces, and the surfaces 52, 54 are referred to as the fourth surfaces. The third surfaces 48, 50 are positioned opposite to each other, and the fourth surfaces 52, 54 are also positioned opposite to each other. It is also preferred that the third surfaces 48, 50 and the fourth surfaces 52, 54 are parallel to the bolt axis 29, and such surfaces are sometimes hereinafter referred to as "axis-parallel surfaces" also. This configuration may be utilized so that a conventional wrench or socket may also be used to rotate the bolt 22, i.e., to tighten or to loosen the bolt 22.

In an alternative embodiment, the bolt head body 25 may include only two surfaces that are parallel, and there may be only one channel extending between the two surfaces, and only one slot, that is in fluid communication with the channel and is aligned with the channel. Alternatively, the bolt head may include a channel, and a slot aligned therewith, that do not extend between two side surfaces of the bolt, but instead extend inwardly from only one side surface, to end at a predetermined location in the bolt head body 25. In other alternative configurations, the bolt head may include any suitable number of pairs of opposed side surfaces, and also may include any suitable number of channels and slots aligned therewith.

Those skilled in the art would appreciate also that either of a conventional Philips screwdriver or a conventional flat screwdriver may, in the alternative, be used to tighten or loosen the bolt 22. As can be seen in FIG. 1A, the conventional screwdrivers may be inserted into the slots "S₁", "S₂", as needed. However, it is preferred that the tool 42 is used to rotate the bolt 22, as the tip 46 is unlikely to slip out of the channel once the tip 46 is fully inserted therein.

An alternative embodiment of the fastening system 120 of the invention is illustrated in FIGS. 4A-4C. The fastening system 120 preferably includes a first bolt 122A, a second bolt 122B (FIG. 4A), and a fastening element 160 (FIG. 4B). The fastening system 120 is for securing a first object 156 and a second object 158 together (FIG. 4A).

As can be seen in FIG. 4A, the first object 156 includes a first threaded hole 157 defined by a threaded wall "W₁". The second object 158 includes a second threaded hole 159 defined by a threaded wall "W₂".

In one embodiment, the first bolt 122A preferably includes a first bolt head 124A, and a first shank 126A. The second bolt 122B preferably also includes a second bolt head 124B, and a second shank 126B.

The first and second bolt heads 124A, 124B include respective first and second bolt head bodies 125A, 125B with respective first and second cap surfaces 138A, 138B that are formed to mate together when the first and second bolts 122A, 122B are positioned end-to-end, as shown in FIGS. 4A and 4C. For example, the first and second cap surfaces 138A, 138B may be generally planar, as shown in FIGS. 4A and 4C, so that the first and second bolts 122A, 122B may be positioned end-to-end.

The first and second bolts 122A, 122B, respectively also include first and second threaded portions 128A, 128B on the first and second shanks 126A, 126B. As will be described, it is preferred that the first and second threaded portions 128A, 128B are threaded in opposite directions. Each of the first and second bolts 122A, 122B is symmetrical relative to respective first and second bolt axes 129A, 129B.

It will be understood that the first and second bolt head bodies 125A, 125B of the first and second bolt heads 124A, 124B both have channels and slots formed therein, as described above. Preferably, the first bolt head includes first and second first bolt head channels that intersect in the first bolt head body, as described previously, with first and second first bolt head slots respectively aligned with the first and second first bolt head channels. It is also preferred that the second bolt head includes first and second second bolt head channels, and first and second second bolt head slots aligned therewith.

For clarity of illustration, in FIG. 4A, only one channel "AB₂" and one slot "AS₂" in fluid communication with the channel "AB₂" (i.e., corresponding to the channel "AB₂") are shown in the first bolt head body 125A of the first bolt head 124A. It will be understood that the first bolt head 124A also includes another channel that is orthogonal to the channel "AB₂", and another slot that is orthogonal to the slot "AS₂", and that the additional channel and the additional slot are not shown in the drawings for clarity of illustration.

Similarly, in FIG. 4A, only one channel "BB₂" and one slot "BS₂" in fluid communication with the channel "BB₂" (i.e., corresponding with the channel "BB₂") are shown in the second bolt head body 125B of the second bolt head 124B. It will be understood that the second bolt head 124B also includes another channel that is orthogonal to the channel "BB₂", and another slot that is orthogonal to the slot "BS₂", and that the additional channel and the additional slot are not shown in the drawings for clarity of illustration.

It will be understood that each of the first and second bolts 122A, 122B is tightened into the respective threaded holes 157, 159 in the objects 156, 158. This is achieved in the same manner as described above, i.e., the threaded portions 128A, 128B of the first and second shanks 126A, 126B are threadably engaged in the threaded holes 157, 159 with the threaded walls "W", "W" when the bolts 122A, 122B are rotated about their respective axes 129A, 129B due to the rotation of the tool (not shown in FIGS. 4A-4C) when the tip is inserted in the selected channel in each of the bolt heads respectively. Those skilled in the art would appreciate that tightening the bolts 122A, 122B in the respective holes 157, 159 preferably takes place separately, when the objects 156, 158 are sufficiently spaced apart from each other.

As shown in FIG. 4A, in order to secure the first and second bolts 122A, 122B together, the bolts 122A, 122B preferably are positioned with their respective cap surfaces 138A, 138B abutting, with the respective bolt axes 129A, 129B of the first and second bolts 122A, 122B aligned, and with the slots "$AS_2$", "$BS_2$" aligned, and also with the channels "$AB_2$", "$BB_2$" aligned. Once the first and second bolts 122A, 122B are positioned as shown in FIG. 4A, they are ready to be fastened together by the fastener 160.

Preferably, the fastener 160 includes first and second plug elements 162, 164 that are connected to each other by a connecting element 166 (FIG. 4B). In order to secure the first a d second bolts 122A, 122B together, after the bolts 122A, 122B are positioned as illustrated in FIG. 4A (i.e., with channels and slots aligned), the fastener 160 preferably is moved into a pair of the aligned channels and slots.

As can be seen in FIG. 4C, once the fastener 160 is in the aligned channels and slots, the first plug element 162 is received in the channel "$AB_2$", the second plug element 164 is received in the other aligned channel "$BB_2$", and the connecting element 166 is received in each of the aligned slots "$AS_2$", "$BS_2$".

It will be understood that the fastener 160 may have any suitable length "Q" (FIG. 4B). Preferably, the length "Q" of the fastener 160 is equal to, or approximately equal to, the lengths of the channels "$AB_2$", "$BB_2$". It will be understood that the lengths of the channels "$AB_2$", "$BB_2$" preferably are equal, or approximately equal to each other.

Those skilled in the art would appreciate that the fastener 160 and each of the first and second bolt heads 124A, 124B may be magnetized, to assist in retaining the fastener 160 in the respective aligned channels and slots.

In use, the first and second threaded portions 128A, 128B preferably are first tightened into the first and second objects 156, 158 that are to be joined by the fastening system 120, as noted above. The bolts 122A, 122B are adjusted as necessary (i.e., by rotation thereof about their respective axes 129A, 129B) to align channels and slots therein. Those skilled in the art would appreciate that such adjustment is made by rotation of the bolt about its axis, and does not involve a significant change in the position of the bolt head relative to the object in which the bolt is secured.

Subsequently, the first and second cap surfaces 138A, 128B are engaged with each other. It will be understood that this involves positioning the first and second objects 156, 158, so that the first and second cap surfaces 138A, 138B abut each other, as illustrated in FIG. 4A. Once the bolts 122A, 122B are positioned as illustrated in FIG. 4A, the fastener 160 is inserted into the aligned channels, and simultaneously into the aligned slots that are in fluid communication with the aligned channels. The first and second plug elements 162, 164 are inserted into the channels in the respective first and second bolt heads 124A, 124B that are aligned, and the connecting element 166 is inserted into the slots that are aligned with those channels.

It will be understood that either of the channels in either of the bolt heads 124A, 124B may be aligned. It will also be understood that the channels that are aligned in FIG. 4A, i.e., channels "$AB_2$" and "$BB_2$", are exemplary only.

The fastening element 160 may be magnetic, so that it is attracted to each of the first and second bolt heads 124, 124B. Preferably, each of the first and second bolt heads 124A, 124B is also magnetic, so that they are attracted to each other. Accordingly, once the fastening element 160 is positioned in the aligned channels and the slots corresponding thereto (e.g., channels "$AB_2$", "$BB_2$" and the slots "$AS_2$", "$BS_2$", as illustrated in FIG. 4A), the fastening element 160 is unlikely to be dislodged therefrom inadvertently. However, the magnetism preferably is also sufficiently weak that the fastening element 160 can be removed, e.g., if the user wishes to separate the first and second bolts 122A, 122B from each other.

From the foregoing, it can be seen that the fastening system 120 may be used to hold together two separate components or objects in which the threaded portions 128A, 128B of the first and second bolts 122A, 122B are secured. Those skilled in the art would appreciate that the fastening system 120 may be utilized in an environment where conventional methods of securing components together (e.g., conventional welding methods) may not be suitable.

Figure 6A:
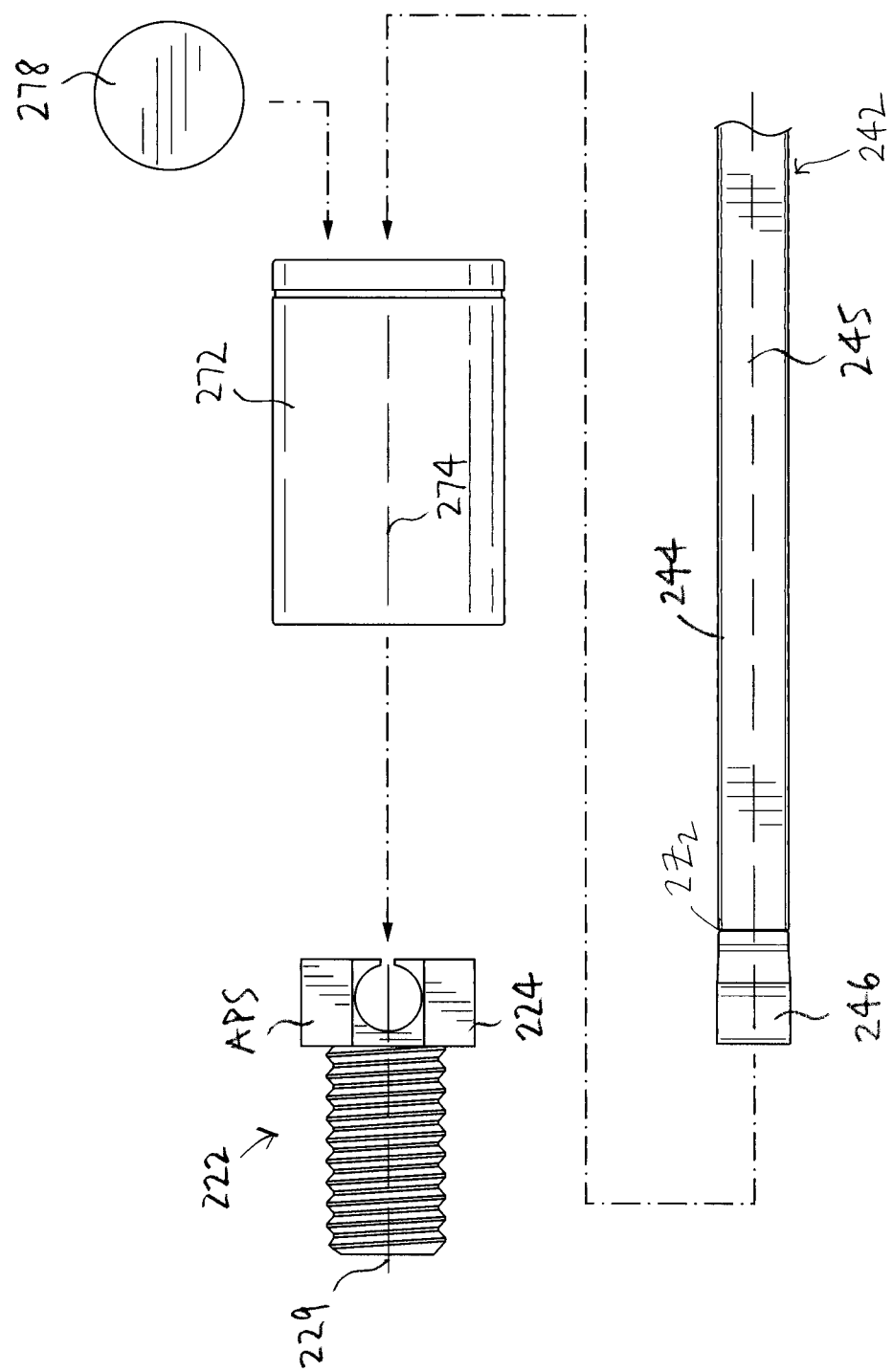
FIG. 6A is an exploded view of the fastening system of FIG. 5.

In another embodiment, a fastening system 220 of the invention preferably includes a driving assembly 270 that includes a socket 272 defined by a socket axis 274 (FIGS. 5, 6A). Those skilled in the art would appreciate that the socket 272 includes internal socket surfaces 276 (FIG. 6C) that are formed for engagement with selected ones of the axis-parallel surfaces "APS" of the bolt head 224 of the bolt 222 (FIG. 5), that are parallel with the bolt axis 229.

It will be understood that the bolt head 224 preferably includes a number of surfaces that are parallel to the bolt axis 229, similar to the surfaces of the bolt 22 identified by reference numerals 30, 32, 34, 36, 48, 52, and 54, as illustrated in FIG. 1A. As noted above, each of the axis-parallel surfaces of the bolt 222 is parallel to the bolt axis 229. For clarity of illustration, the axis-parallel surfaces are identified in FIGS. 5-6D by reference character "APS".

Figure 6B:
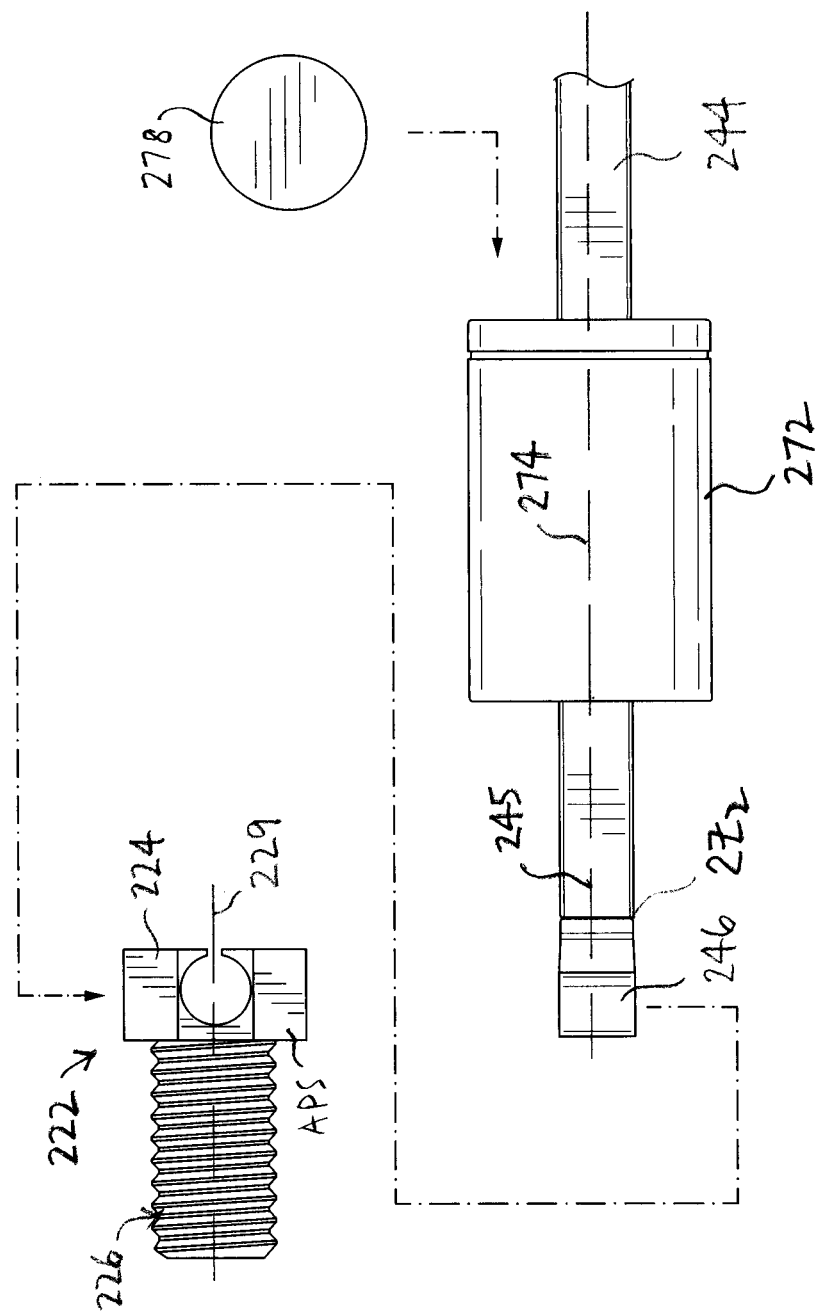
FIG. 6B is an exploded view of the fastening system of FIG. 5, partially assembled.

In one embodiment, the socket 272 may be a conventional socket. Preferably, and as can be seen in FIGS. 6A-6E, the socket 272 is mountable on the blade 244. The socket 272 preferably is first mounted coaxially (or approximately coaxially) on the blade 244 in an intermediate location on the blade 244, as illustrated in FIG. 6B, which is intermediate between the first end (not shown in FIG. 6B) and the second end "$2Z_2$" of the blade 244. As will be described, the socket axis 274 preferably is alignable, or substantially alignable, with the tool axis 245.

Figure 6C:
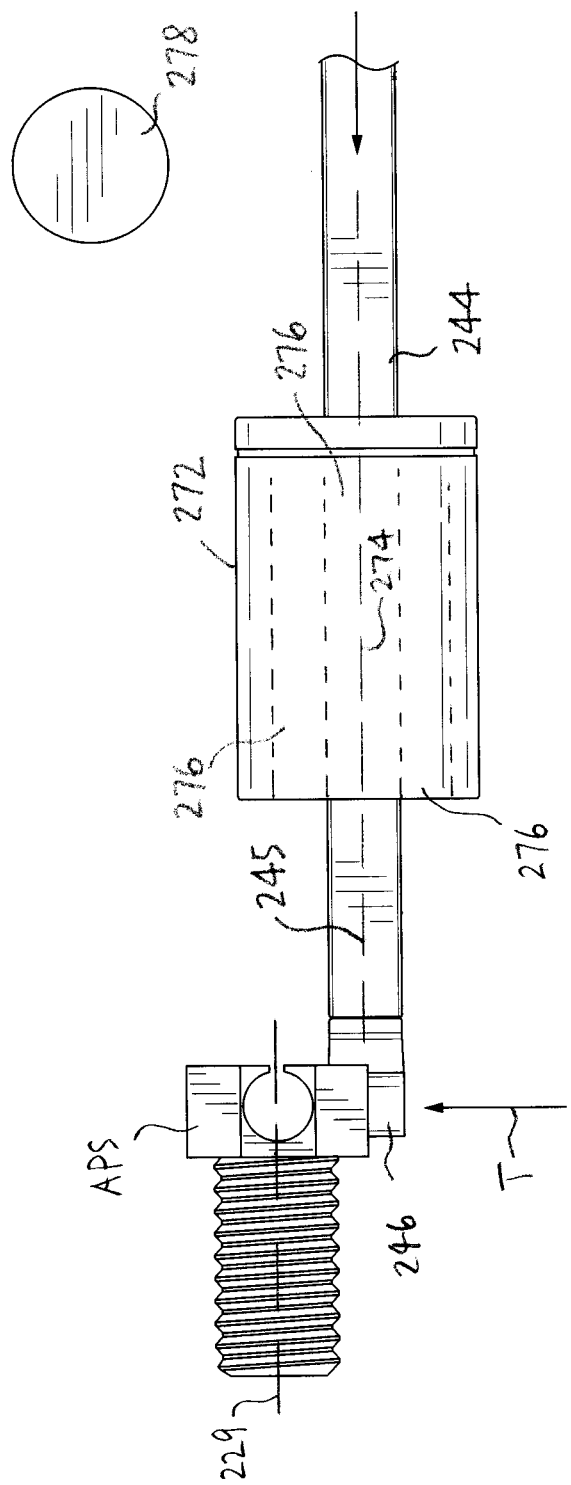
FIG. 6C is a side view of the fastening system of FIGS. 5-6B in which the elements are shown partially assembled.
Figure 6D:
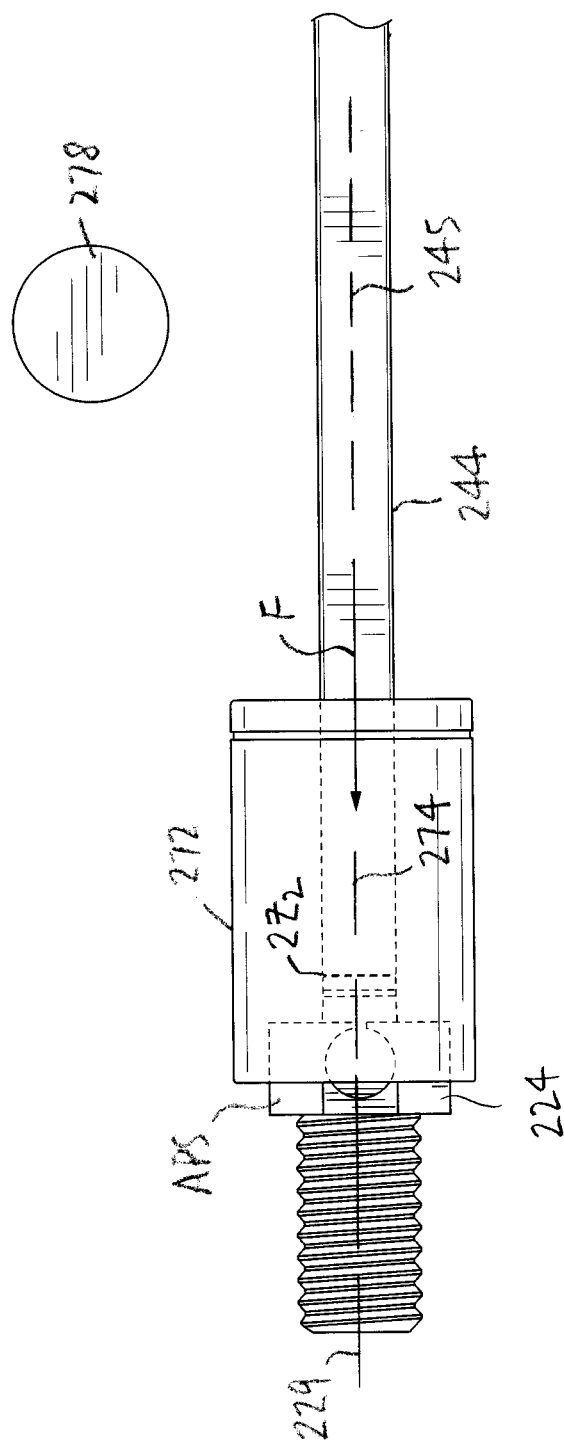
FIG. 6D is another side view of the fastening system of FIGS. 5-6C.

As can be seen in FIGS. 6B-6D, once the socket 272 is coaxially located on the blade 244 at an intermediate position, the tip 246 preferably is inserted into a selected one of the first and second channels in the bolt head body 225. The tip 246 is moved transversely relative to the bolt axis 229 until the tool axis 245 and the bolt axis 229 are aligned, or substantially aligned. The transverse movement of the tip 246, to insert it into the selected channel, and when it is in the selected channel in the bolt head 224 (i.e., to align the tool axis 245 with the bolt axis 229) is schematically indicated by arrow "T" in FIG. 6C.

As can be seen in FIG. 6D, after the tool axis 245 is aligned with the bolt axis 229, with the tip 246 (not shown in FIG. 6D) being located in the selected one of the channels), the socket 272 is movable along the blade 244 to the bolt 222 as indicated by arrow "F" in FIG. 6D, to engage the internal socket surfaces 276 with the axis-parallel surfaces "APS" of the bolt head 224. The socket 272 is moved in the direction indicated by arrow "F" from its intermediate position on the blade 244 generally toward the second end of the blade 244, and partly beyond the second end, to engage the socket 272 with the bolt head 224. As the socket 272 is moved in the direction indicated by arrow "F", the internal socket surfaces 276 respectively engage with axis-parallel surfaces "APS" of the bolt head 224, i.e., the socket 272 engages the bolt head 224. When the internal socket surfaces 276 are engaged with the axis-parallel surfaces "APS" of the bolt head 224, the socket 272 is engaged with the bolt head 224.

In FIG. 6D, the socket 272 is shown partially engaged with the bolt head 224, for clarity of illustration. It will be understood that the socket 272 preferably is moved in the direction indicated by arrow "F" in FIG. 6D until further movement in that direction is prevented by the bolt head 224, at which point the socket 272 is fully engaged with the bolt head 224. The socket 272 is shown fully engaged with the socket 272 in FIG. 6E.

Those skilled in the art would appreciate that the internal surfaces 276 of the socket 27 preferably are configured for engagement with all of the axis-parallel surfaces "APS" of the bolt head 224. For example, if the bolt head 224 has eight axis-parallel surfaces "APS", then it is preferred that there are also eight internal surfaces 276, sized and shaped for engagement with the axis-parallel surfaces "APS". However, those skilled in the art would also appreciate that, depending on the configurations of the axis-parallel surfaces "APS" and the internal surfaces 276, the socket 272 may engage the bolt head 224 when the internal surfaces 276 and the axis-parallel surfaces "APS" partially match with each other.

It will be understood that the socket 272 may include any suitable number of the internal socket surfaces 276. Depending on the number of axis-parallel surfaces of the bolt head, the socket 272 may be a conventional socket, with a conventional number of internal socket surfaces.

Figure 6E:
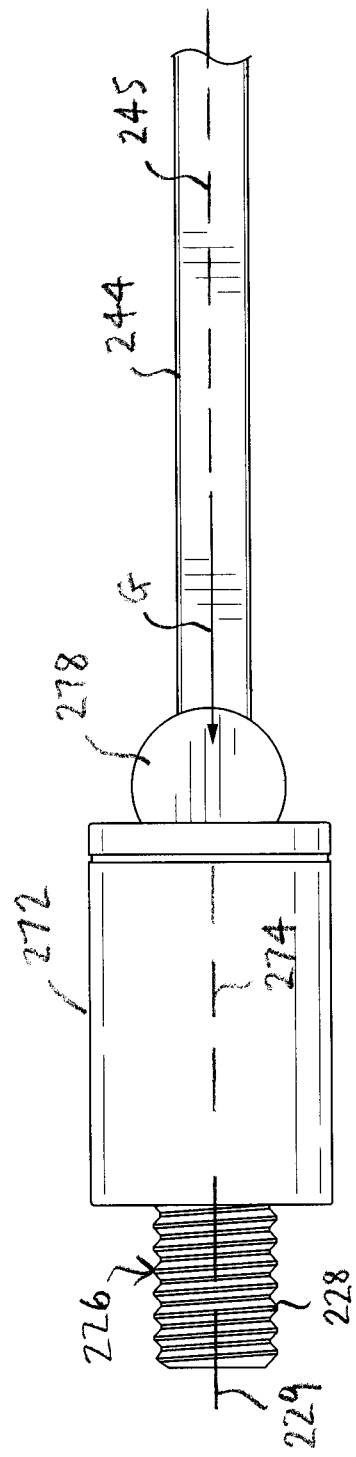
FIG. 6E is another side view of the fastening system of FIGS. 5-6D.

It will be understood that, when the socket 272 is engaged with the bolt head 224, the socket 272 is coaxial with the blade 244, and is also coaxial with the bolt axis 229 (FIG. 6E). It is also preferred that the socket 272 is secured to the blade 244, after the socket 272 is engaged with the bolt head 224, so that rotation of the blade 244 causes corresponding rotation of the socket 272. As a result, rotation of the blade 244 causes corresponding rotation of the bolt 222 about the bolt axis 229.

It will be understood that the socket 272 may be formed so that the blade 244 fits into the socket 272 in a clearance fit, so that rotation of the blade 244 about the tool axis 245 results in corresponding rotation of the socket 272 about the socket axis 274, which is coaxial with the tool axis 245. However, the socket 272 may be conventional, and the blade 244 may not fit into the socket 272 is a sufficiently close clearance fit. Accordingly, in one embodiment, the fastening system 220 preferably also includes an anchor element 278 for securing the socket 272 to the blade 244, when the socket 272 is engaged with the bolt head 274. As can be seen in FIG. 6E, the anchor element 278 preferably is moved in the direction indicated by arrow "G" so that at least part of the anchor element 278 is located or wedged between the blade 244 and the socket 272.

Once the socket 272 is fully engaged with the bolt head 224 (FIG. 6E), rotation of the tool 242 about the tool axis 245 has the effect of simultaneously causing the tip 246 to urge the bolt 222 to rotate, and causing the socket 272 to urge the bolt 222 to rotate correspondingly relative to the rotation of the blade 244.

In use, it will be understood that, initially, the socket 272 preferably is located at an intermediate position on the blade (as illustrated in FIGS. 6B and 6C) when the tip 246 is inserted into the selected one of the channels, and when the tip 246 is moved along the selected one of the channels until the tool axis 245 is substantially aligned with the bolt axis 229. Once the tool axis 245 and the bolt axis 229 are substantially aligned, as shown in FIG. 6D, the socket 272 is moved toward the second end "2Z$_2$" of the blade 244 in the direction indicated by arrow "F", until the socket 272 engages the bolt head 224.

Once the socket 272 engages the bolt head 224, in one embodiment, the anchor element 278 preferably is engaged, as described above, to secure the socket 272 to the blade 244. Rotation of the tool 242 about the tool axis 245 causes the socket 272 and the tip 246 to simultaneously urge the bolt 222 to rotate correspondingly relative to rotation of the tool 242.

Rotation of the bolt 222 about the bolt axis 229 causes corresponding rotation of the threaded portion 228 on the shank 226 to threadably engage a threaded wall (not shown), causing the bolt to be tightened in the hole (not shown) defined by the threaded wall, or loosened therein, as the case may be.

Those skilled in the art would appreciate that, once the bolt 222 has been tightened or released (as the case may be), by rotation of the tool 242 about the tool axis 245 (i.e., to cause the socket 272 to rotate about the socket axis 274, and simultaneously to cause the tip 246 to urge the bolt 222 to rotate about the bolt axis 229), the steps followed in engaging the socket 272 with the bolt 222 are reversed.

In one embodiment, the anchor element 278 preferably is releasable, to allow the socket 272 to move substantially coaxially along the blade 244, toward the first end "2Z$_1$" of the blade 244, i.e., in the direction opposite to the direction indicated by arrow "G". It will be understood that the anchor element 278 preferably is removable by moving the anchor element 278 in a direction opposite to the direction indicated by arrow "G".

Once the anchor element 278 is removed or disengaged, the socket 272 may be moved along the blade 244, generally toward the first end "2Z$_1$" of the blade 244, to disengage the socket 272 from the bolt head 224. Such movement of the socket 272 is in a direction opposite to the direction indicated by arrow "F". The socket 272 is disengaged from the bolt head 224, and moved toward the first end "2Z$_1$", at least until the socket 272 has cleared the bolt 224. The socket 272 may then be in an intermediate position on the blade 244. Next, the tip 246 is removed from the selected one of the channels, by moving the tip along that channel until the tip 246 exits the channel. Those skilled in the art would appreciate that the movement of the tip 246 along the selected one of the channels is in a direction transverse to the bolt axis 229.

In one embodiment, the anchor element 278 preferably is magnetized, so that it may be held more firmly in position when it is engaged between the socket 272 and the blade 244.

Figure 7:
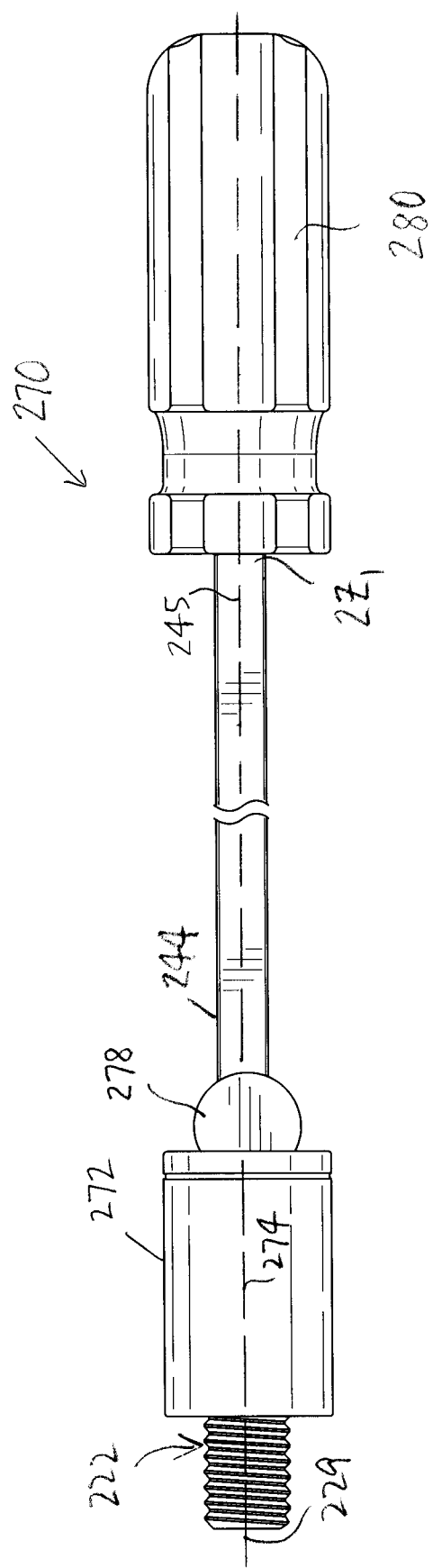
FIG. 7 is a side view of the assembled fastening system of FIGS. 5-6E.

It will be understood that any suitable means for rotating the blade 244 about the tool axis 245 may be utilized. In FIG. 7, the socket 272 is shown engaged with the bolt head 224 (not shown in FIG. 7), and the anchor element 278 is engaged between the socket 272 and the blade 244, to hold the socket 272 to the blade 244. As can be seen in FIG. 7, in one embodiment, the tool 242 preferably includes a handle 280 positioned at the first end "2Z$_1$" of the blade 244. Preferably, the handle 280 is coaxial with the tool axis 245. Those skilled in the art would appreciate that the user may conveniently use the handle 280 to rotate the blade 244 about the tool axis 245, i.e., because the handle 280 is formed to enhance the ability of the user to grip the blade 244 at its first end "2Z$_1$".

It will also be appreciated by those skilled in the art that the invention can take many forms, and that such forms are within the scope of the invention as claimed. The scope of the claims should not be limited by the preferred embodiments set forth in the examples, but should be given the broadest interpretation consistent with the description as a whole.

I claim:

1. A fastening system comprising:
   a bolt comprising:
     a shank comprising a threaded portion, the shank defining a bolt axis of the bolt;
     a bolt head secured to the shank, the bolt head having a bolt head body comprising:
       at least two oppositely-positioned first and second planar surfaces;
       a cap surface transverse to the first and second planar surfaces;
       the bolt head comprising first and second channels extending from the first and second planar surfaces respectively into the bolt head body, the first and second channels being round in cross-section and at least partially defined by respective internal walls in the bolt head body to have respective diameters thereof;
       the bolt head additionally comprising first and second slots in the bolt head body that are respectively aligned with the first and second channels and respectively extending between the first and second channels and the cap surface and respectively extending between the first and second planar surfaces, the first and second slots being narrower than the respective diameters of the first and second channels;
   a tool comprising:
     a blade extending between first and second ends thereof, the blade defining a tool axis of the tool;
     a tip located at the second end, the tip being round in cross-section and sized to fit into a selected one of the first and second channel in a clearance fit; and
     the blade being receivable in a corresponding one of the first and second slots that corresponds to the selected one of the first and second channels when the tip is located therein;
   wherein, when the tip of the tool is received in the selected one of the first and second channels, removal of the tip therefrom in a direction parallel to the bolt axis is prevented by the bolt head body, the tip of the tool is engageable with the internal wall partially defining the selected one of the first and second channels, and rotation of the blade about the tool axis causes the tip of the tool to engage said internal wall and to urge corresponding rotation of the bolt head about the bolt axis.

2. A fastening system according to claim 1 in which the first and second planar surfaces are axis-parallel surfaces, positioned parallel to the bolt axis.

3. A fastening system according to claim 2 additionally comprising:
   a driving assembly comprising a socket defined by a socket axis, the socket comprising internal socket surfaces formed for engagement with selected ones of the axis-parallel planar surfaces of the bolt head;
   the socket being mountable on the blade, wherein the socket is securable to the blade and the socket axis is alignable with the tool axis;
   wherein, when the tool axis is aligned with the bolt axis, the socket is coaxially movable along the blade toward the second end of the blade to position the socket on the bolt, for engaging the internal socket surfaces with the selected ones of the axis-parallel planar surfaces of the bolt head, and the socket is securable to the blade, wherein rotation of the blade causes corresponding rotation of the socket, urging corresponding rotation of the bolt about the bolt axis.

4. A fastening system according to claim 3 additionally comprising an anchor element for securing the socket to the blade when the internal socket surfaces are engaged with the axis-parallel planar surfaces of the bolt.

5. A fastening system according to claim 4 in which the anchor element is releasable, to allow the socket to move coaxially along the blade toward the first end of the blade, to remove the socket from engagement with the bolt.

6. A fastening system according to claim 5 in which the tip is magnetized and the bolt head 34 is made of magnetic material, for releasably securing the tip in the selected one of the first and second channels.

7. A fastening system according to claim 5 in which the anchor element is magnetized, to hold the anchor element in position between the socket and the blade.

8. A fastening system according to claim 2 in which the bolt head body additionally comprises oppositely-positioned third and fourth planar surfaces that are positioned parallel to the bolt axis.

9. A fastening system according to claim 8 in which the first and second slots intersect in the bolt head at a point that is aligned with the bolt axis.

10. A fastening system according to claim 1 in which the first and second channels are located orthogonal to each other.

11. A fastening system according to claim 10 in which the first and second channels intersect in the bolt head body at a point that is aligned with the bolt axis.

12. A fastening system according to claim 11 in which the tool is positionable to align the tool axis with the bolt axis when the tip is located in the selected one of the first and second channels.

13. A method of securing a bolt to an object with a threaded hole therein defined by a threaded wall in the object, the method comprising:
   (a) providing the bolt with a bolt head secured to a shank comprising a threaded portion, the shank defining a bolt axis of the bolt, the threaded portion being configured for threadable engagement with the threaded wall, the bolt head having a bolt head body comprising:
     at least two oppositely-positioned first and second planar surfaces;
     a cap surface transverse to the first and second planar surfaces;
   the bolt head comprising first and second channels extending from the first and second planar surfaces respectively into the bolt head body, the first and second channels being round in cross-section and at least partially defined by respective internal walls in the bolt head body to have respective diameters thereof;
   the bolt head additionally comprising first and second slots in the bolt head body that are respectively aligned with the first and second channels and respectively extending between the first and second channels and the cap surface and respectively extending between the first and second planar surfaces, the first and second slots being narrower than the respective diameters of the first and second channels;

(b) providing a tool comprising:
- a blade extending between first and second ends thereof, the blade defining a tool axis thereof;
- a tip located at the second end, the tip being round in cross-section and sized to fit into the first channel and the second channel in a clearance fit;
- the blade being receivable in a corresponding one of the first and second slots that corresponds to the selected one of the first and second channels, when the tip is received in the selected one of the first and second channels;

(c) inserting the tip in the selected one of the first and second channels, and inserting the blade in the corresponding one of the first and second slots, wherein removal of the tip from the selected one of the channels in a direction parallel to the bolt axis is prevented by the bolt head body;

(d) moving the tip along the selected one of the first and second channels, and sliding the blade along the corresponding one of the first and second slots, to align the tool axis with the bolt axis; and (e) rotating the blade about the tool axis to engage the tip with the internal wall in the selected one of the first and second channels, to cause the shank to rotate in the threaded hole in the object, for threadable engagement of the threaded portion of the shank with the threaded wall.

14. A method according to claim 13 additionally comprising:

(s) providing a driving assembly comprising a socket defined by a socket axis, the socket comprising internal socket surfaces formed for engagement with selected ones of the axis-parallel planar surfaces of the bolt head;
- the socket being mountable on the blade, wherein the socket is securable to the blade and the socket axis is alignable with the tool axis;
- the socket being coaxially movable along the blade toward the second end of the blade to position the socket on the bolt, engaging the internal socket surfaces with the selected ones of the axis-parallel planar surfaces of the bolt head; and
- the socket being securable to the blade, wherein rotation of the blade causes corresponding rotation of the socket, urging corresponding rotation of the bolt about the bolt axis.

15. A method according to claim 14 additionally comprising providing an anchor element for securing the socket to the blade when the internal socket surfaces are engaged with the axis-parallel planar surfaces of the bolt.

16. A method according to claim 15 in which the anchor element is releasable, to allow the socket to move coaxially along the blade toward the first end of the blade, to remove the socket from engagement with the bolt.

17. A fastening system comprising:
- a bolt comprising:
  - a shank comprising a threaded portion, the shank defining a bolt axis of the bolt;
  - a bolt head secured to the shank, the bolt head having a bolt head body comprising:
    - at least two oppositely-positioned planar surfaces;
    - a cap surface transverse to the planar surfaces;
  - the bolt head comprising a channel extending in the bolt head body between the planar surfaces, the channel being round in cross-section and at least partially defined by an internal wall in the bolt head body having a diameter thereof;
  - the bolt head additionally comprising a slot in the bolt head body that is aligned with the channel and extends between the channel and the cap surface, the slot extending between the planar surfaces, the slot being narrower than the diameter of the channel;
- a tool comprising:
  - a blade extending between first and second ends thereof, the blade defining a tool axis of the tool;
  - a tip located at the second end, the tip being round in cross-section and sized to fit into the channel in a clearance fit; and
  - the blade being receivable in the slot when the tip is located in the channel;
- wherein, when the tip of the tool is received in the channel, removal of the tip therefrom in a direction parallel to the bolt axis is prevented by the bolt head body, the tip of the tool is engageable with the internal wall partially defining the selected one of the first and second channels, and rotation of the blade about the tool axis causes the tip of the tool to engage said internal wall and to urge corresponding rotation of the bolt head about the bolt axis.

* * * * *